US009727363B2

(12) United States Patent
Wang

(10) Patent No.: US 9,727,363 B2
(45) Date of Patent: Aug. 8, 2017

(54) VIRTUAL MACHINE MIGRATION

(71) Applicant: Dalian University of Technology, Dalian, Liaoning (CN)

(72) Inventor: Xingyuan Wang, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 244 days.

(21) Appl. No.: 14/438,783

(22) PCT Filed: Apr. 30, 2014

(86) PCT No.: PCT/CN2014/076576
§ 371 (c)(1),
(2) Date: Apr. 27, 2015

(87) PCT Pub. No.: WO2015/165060
PCT Pub. Date: Nov. 5, 2015

(65) Prior Publication Data
US 2016/0266919 A1    Sep. 15, 2016

(51) Int. Cl.
G06F 9/455 (2006.01)
(52) U.S. Cl.
CPC .. *G06F 9/45558* (2013.01); *G06F 2009/4557* (2013.01); *G06F 2009/45595* (2013.01)
(58) Field of Classification Search
None
See application file for complete search history.

(56) References Cited

U.S. PATENT DOCUMENTS

| 6,145,066 | A | 11/2000 | Atkin |
| 7,415,591 | B1 | 8/2008 | Todd et al. |
| 8,271,814 | B2 * | 9/2012 | Padmanabhan ....... G06F 1/3209 713/310 |
| 8,316,125 | B2 | 11/2012 | DeHaan |
| 8,359,223 | B2 | 1/2013 | Chi et al. |
| 8,359,375 | B2 | 1/2013 | Ryan et al. |
| 2007/0006218 | A1 | 1/2007 | Vinberg et al. |
| 2009/0177661 | A1 | 7/2009 | Sandorfi et al. |
| 2011/0179415 | A1 | 7/2011 | Donnellan et al. |
| 2012/0054731 | A1 | 3/2012 | Aravamudan et al. |

(Continued)

FOREIGN PATENT DOCUMENTS

| CN | 103036919 A | 4/2013 |
| CN | 103460191 A | 12/2013 |

OTHER PUBLICATIONS

"Cloud Migration Company Announces $7 Million Funding," accessed at http://www.racemi.com/seriesb/, accessed on Feb. 6, 2015, pp. 2.

(Continued)

*Primary Examiner* — Kenneth Tang
(74) *Attorney, Agent, or Firm* — Brundidge & Stanger, P.C.

(57) ABSTRACT

In some examples, prior to a source cloud migrating one or more virtual machines to a destination cloud, a migration controller may establish one or more migration agreements between at least two of a client, a provider of the source cloud, and a provider of the destination cloud. The migration controller may further sort the virtual machines that execute on the source cloud based on a usage frequency and select an instance of each of the virtual machines to migrate.

21 Claims, 6 Drawing Sheets

(56) References Cited

U.S. PATENT DOCUMENTS

| | | |
|---|---|---|
| 2012/0064908 A1 | 3/2012 | Fox et al. |
| 2012/0110279 A1 | 5/2012 | Fredricksen et al. |
| 2012/0221684 A1 | 8/2012 | Ferris |
| 2012/0221845 A1 | 8/2012 | Ferris |
| 2012/0254862 A1 | 10/2012 | Dong |
| 2012/0303739 A1 | 11/2012 | Ferris |
| 2012/0324443 A1 | 12/2012 | Low et al. |
| 2013/0014078 A1 | 1/2013 | Tung et al. |
| 2013/0047150 A1 | 2/2013 | Malasky et al. |
| 2013/0085959 A1 | 4/2013 | Qian |
| 2013/0085989 A1 | 4/2013 | Nayyar et al. |
| 2013/0091285 A1 | 4/2013 | Devarakonda et al. |
| 2013/0166504 A1 | 6/2013 | Varkhedi et al. |
| 2013/0198476 A1 | 8/2013 | Nakajima et al. |
| 2014/0019970 A1 | 1/2014 | Okamoto |
| 2014/0359134 A1 | 12/2014 | Yoshida |
| 2015/0012917 A1 | 1/2015 | Jiang et al. |
| 2015/0019195 A1 | 1/2015 | Davis |

OTHER PUBLICATIONS

"Data Migration," Informatica: accessed at http://web.archive.org/web/20130820040243/http://www.informatica.com/us/solutions/enterprise-data-integration-and-management/data-migration/, accessed on Feb. 6, 2015, pp. 3.

"File:Cloud computing.svg," accessed at http://web.archive.org/web/20130425032943/http://en.wikipedia.org/wiki/File: Cloud_computing.svg, accessed on Feb. 6, 2015, pp. 7.

"RiverMeadow Software™ Cloud Migration SaaS Selected as Server Onboarding Solution for PeakColo's Cloud Computing Platform," accessed at http://www.marketwired.com/press-release/rivermeadow-software-cloud-migration-saas-selected-as-server-onboarding-solution-peakcolos-1753599.htm, accessed on Feb. 6, 2015, pp. 3.

"RiverMeadow's Cloud Migration SaaS to Be Integrated Into the Cisco Cloud On-Boarding Service," Accessed at http://www.marketwired.com/press-release/rivermeadows-cloud-migration-saas-be-integrated-into-cisco-cloud-on-boarding-service-1778193.htm, Posted on Apr. 12, 2013, pp. 2.

"Service Level Agreement: Cloud Big Data Platform SLA," Accessed at http://www.rackspace.com/information/legal/cloud/sla, Accessed on Feb. 9, 2015, pp. 3.

Bonvin, N. et al., "Autonomic SLA-driven Provisioning for Cloud Applications," 11th IEEE/ACM International Symposium on Cluster, Cloud and Grid Computing, pp. 434-443 (2011).

Furbush, J., "Data security remains biggest hurdle to public cloud adoption," accessed at http://web.archive.org/web/20130818043337/http://searchcloudcomputing.techtarget.com/news/2240174565/Data-security-remains-biggest-hurdle-to-public-cloud-adoption, published on Dec. 13, 2012, pp. 15.

International Search Report and Written Opinion for International Application No. PCT/CN2014/076576, mailed on Jan. 28, 2015.

International Search Report and Written Opinion for International Application No. PCT/US2013/62101, mailed on Apr. 9, 2014.

International Search Report and Written Opinion for International Application No. PCT/US2014/15648, mailed on Jun. 27, 2014.

Mishra, M. et al., "Dynamic Resource Management Using Virtual Machine Migrations," IEEE Communications Magazine, pp. 34-40 (2012).

Pariseau, B., "Cloud migration between public clouds remains arduous," accessed at http://web.archive.org/web/20140107212214/http://searchcloudcomputing.techtarget.com/news/2240179693/Cloud-migration-between-public-clouds-remains-arduous, published on Mar. 15, 2013, pp. 14.

Pariseau, B., "Private cloud to public cloud migration gets easier, but obstacles remain," accessed at http://web.archive.org/web/20130704050413/http://searchcloudcomputing.techtarget.com/news/2240179690/Private-cloud-to-public-cloud-migration-gets-easier-but-obstacles-remain, published on Mar. 15, 2013, pp. 16.

Peterson, B., "Top five data migration tools," accessed at http://web.archive.org/web/20140101115326/http://searchitchannel.techtarget.com/feature/Top-five-data-migration-tools, accessed on Feb. 6, 2015, pp. 12.

Sakr, S. and Liu, A., "SLA-Based and Consumer-Centric Dynamic Provisioning for Cloud Databases," IEEE 5th International Conference on Cloud Computing, pp. 360-367 (2012).

Shouheng, T., "Cloud Computing and Data Storage Technology," Computer Development and Applications, vol. 9, No. 23, pp. 1-4 (2010) (English abstract).

Xu, J., "Multi-Objective Virtual Machine Placement in Virtualized Data Center Environments," 2010 IEEE/ACM Int'l Conference on & Int'l Conference on Cyber, Physical and Social Computing (CPSCom), Dec. 18-20, 2010, pp. 179-188.

* cited by examiner

400

VIRTUAL MACHINE MIGRATION

CROSS-REFERENCE TO RELATED APPLICATION

This Application is the U.S. National Stage filing under 35 U.S.C. §371 of International Application Ser. No. PCT/CN2014/076576 filed on Apr. 30, 2014. The disclosure of the International Application is hereby incorporated herein by reference in its entirety.

TECHNICAL FIELD

The technologies described herein pertain generally, but not exclusively, to migration of virtual machines from a source cloud to a destination cloud.

BACKGROUND

Unless otherwise indicated herein, the approaches described in this section are not prior art to the claims in this application and are not admitted to be prior art by inclusion in this section.

In a cloud-based computing system ("cloud" hereafter), a client may rent one or more virtual machines that execute on one or more physical nodes of the cloud to perform computing tasks for the client. Subsequently, the client may migrate the execution of the virtual machines from the aforementioned cloud to another cloud.

SUMMARY

Technologies are generally described for virtual machines migration. The various techniques described herein may be implemented in various devices, methods and/or systems.

In some examples, various embodiments may be implemented as methods. Some methods may include establishing one or more migration agreements, wherein the one or more migration agreements apply to two or more of a client, a source cloud, and a destination cloud, wherein the one or more migration agreements include identifiers, provided by the client, of one or more virtual machines to be migrated from the source cloud to the destination cloud under terms of the one or more migration agreements, and wherein the source cloud maintains at least two instances of each of the one or more virtual machines to be migrated in a respective node, the at least two instances including each respective virtual machine to be migrated and at least one copy of each respective virtual machine to be migrated; ordering a sequence of the one or more virtual machines to be migrated, wherein the ordering is based on one of a usage frequency of respective ones of the one or more virtual machines to be migrated; identifying one instance of each of the one or more virtual machines to be migrated based on proximity between the respective node and a destination node on the destination cloud; and instructing the source cloud to migrate the identified instance of each of the one or more virtual machines to be migrated under terms of the one or more migration agreements.

In some examples, various embodiments may be implemented as systems. Some systems may include a source cloud that includes multiple physical nodes; multiple virtual machines to be migrated to a destination cloud, wherein the multiple virtual machines execute on the source cloud, and wherein the source cloud maintains at least two instances of each of the multiple virtual machines in a respective node of the multiple physical nodes, the at least two instances including each respective virtual machine and at least one copy of each respective virtual machine; and a migration controller configured to: establish one or more migration agreements, wherein the one or more migration agreements apply to two or more of a client, the source cloud, and the destination cloud; order a sequence of the multiple virtual machines to be migrated, wherein the sequence is ordered based on a usage frequency of respective ones of the multiple virtual machines to be migrated; identify one of the at least two instances of each of the multiple virtual machines to migrate based on proximity between the respective node and a destination node on the destination cloud; instruct the source cloud to migrate the identified instance of each one of the multiple virtual machines to be migrated in accordance with the sequence to the destination cloud under terms of the one or more migration agreements; and reward or penalize a service provider of the source cloud in accordance with the one or more migration agreements.

In some examples, various embodiments may be implemented as computer-readable mediums having executable instructions stored thereon. Some computer-readable mediums may store instructions that, when executed, cause one or more processors to perform operations comprising establishing one or more migration agreements, wherein the one or more migration agreements apply to two or more of a client, a source cloud, and a destination cloud, wherein the one or more migration agreements include identifiers, provided by the client, of multiple virtual machines to be migrated from the source cloud to the destination cloud under terms of the one or more migration agreements, and wherein the source cloud maintains at least two instances of each of the multiple virtual machines to be migrated in a respective node, the at least two instances including each respective virtual machine to be migrated and at least one copy of each respective virtual machine to be migrated; ordering a sequence of the multiple virtual machines to be migrated, wherein the ordering is based on a quantity of respective neighboring virtual machines that are controlled by another client of the source cloud; identifying one instance of each of the multiple virtual machines to be migrated based on proximity between the respective node and a destination node on the destination cloud; and instructing the source cloud to migrate the identified instance of each of the multiple virtual machines to be migrated under terms of the one or more migration agreements.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
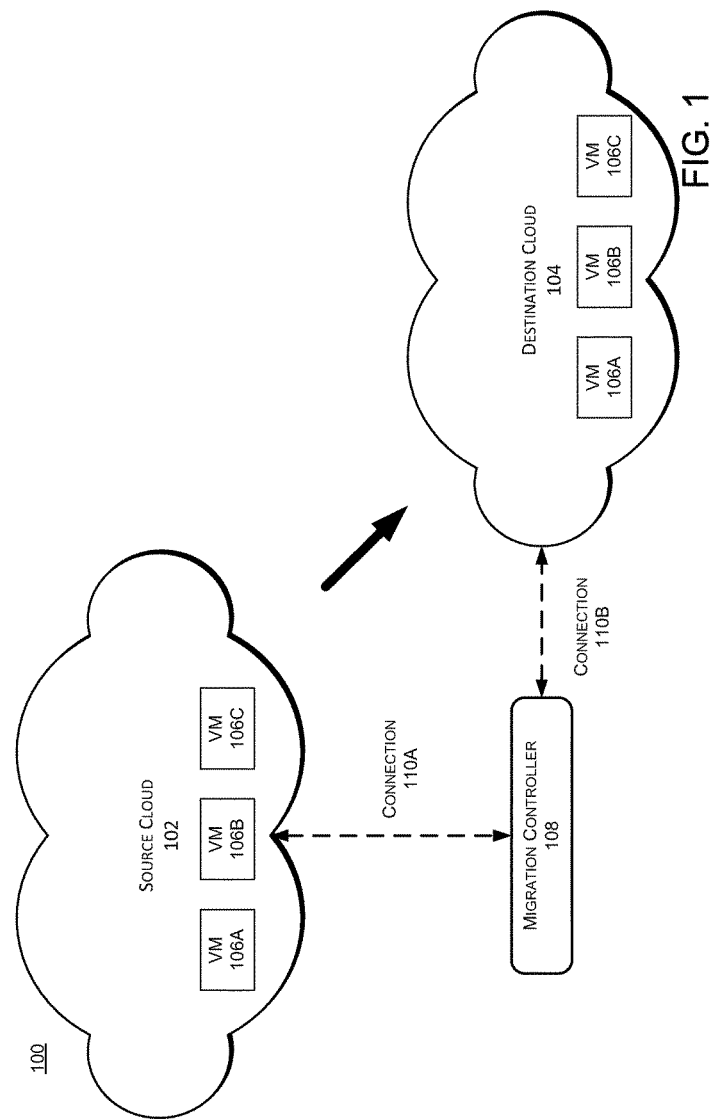
FIG. 1 shows an example system in which virtual machines may be migrated.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Briefly stated, one or more virtual machines in a first cloud ("source cloud" hereafter) may be migrated to a second cloud ("destination cloud" hereafter) for execution. Prior to the migration, agreements may be formed between a client that has rented the virtual machines, the source cloud, and the destination cloud. The agreements may specify terms and clauses that the three parties are obliged to follow during the migration. Further, the migration may be based on one or more factors including usage frequency and geographic locations of instances of the virtual machines.

FIG. 1 shows an example system 100 in which virtual machines may be migrated, arranged in accordance with at least some embodiments described herein. As depicted, system 100 may include, at least, a source cloud 102, a destination cloud 104, a migration controller 108, and one or more connections 110A and 110B. One or more virtual machines ("VM" hereafter) 106A, 106B, . . . 106N may be hosted on source cloud 102. Virtual machines 106A, 106B, . . . , 106N are illustrated in FIG. 1 for simplicity and one skilled in the art will appreciate that a different number of virtual machines may be involved in the virtual machine migration. The quantity of VMs in various embodiments of virtual machine migration is in no way limited in this manner. Further, unless context otherwise requires, collective reference may be made in the following description to "virtual machines 106" or singular reference may be made to "virtual machine 106."

Source cloud 102 may refer to a cloud-based computing system that includes one or more physical nodes communicatively or operably connected through a communication network such as the Internet. As referenced herein, a physical node may refer to one or more computing devices, e.g., computers, tablets, laptops, cellphones, etc., located in one or more geographical locations, such as labs, service centers, research institutions, etc. The physical nodes in source cloud 102 may be configured to execute a program or application collectively or independently. In at least some examples, each of the physical nodes in source cloud 102 may host one or more virtual machines to perform computing tasks for a client. In at least some examples, the client may refer to a person or an entity such as corporations, universities, research institutions, etc.

In general, virtual machines may refer to one or more software emulations of hardware systems with full functionality of physical computing devices or computer systems that may be configured to execute software programs as real physical computing devices. Thus, with regard to FIG. 1, one or more instances of each of virtual machines 106 may be executed or stored in source cloud 102. As referenced herein, an instance may refer to the virtual machine hosted on a physical node on source cloud 102 or one of one or more copies of the virtual machine stored on other physical nodes on source cloud 102. As referenced herein, a copy of a virtual machine may refer to a duplicate of all data associated with that virtual machine. VMs 106 may be configured to perform computing tasks for the client on source cloud 102. In at least some examples, source cloud 102 may be provided by an entity such as corporations, universities, research institutions, etc. The entity may be referred to as "source cloud provider" herein.

Destination cloud 104 may refer to a cloud-based computing system that includes one or more physical nodes communicatively or operably connected through a communication network such as the Internet. As referenced herein, physical nodes in destination cloud 104 may refer to one or more computing devices, e.g., computers, tablets, laptops, cellphones, etc., located in one or more geographical locations, e.g., labs, service centers, research institutions, etc. The physical nodes in destination cloud 104 may be configured to execute a program or application collectively or independently at the same time. In at least some examples, each of the physical nodes in destination cloud 104 may be available for the execution of one or more virtual machines to perform one or more computing tasks for the client. With respect to each of the physical nodes, one or more computing resources, e.g., memory space, network bandwidth, etc., may be available for executing virtual machines to be migrated from source cloud 102. Destination cloud 104 may be similarly provided by an entity that may be referred to as "destination cloud provider" herein.

VMs 106 may refer to virtual machines configured to execute on one or more physical nodes of source cloud 102 to perform computing tasks for a client. A client may refer to a person or entity that instructs or commands VMs 106 to perform computing tasks and may submit payments (e.g., pay a fee) for the fulfillment of such performance. In at least some examples, the client may decide to migrate VMs 106 to destination cloud 104 for some reason such as, e.g., cheaper maintenance costs than source cloud 102. As referenced herein, "migrate," "migrating," and/or "migration" may refer to data associated with VMs 106 on source cloud 102 being copied to one or more physical nodes of destination cloud 104 so that VMs 106 may continue to work in destination cloud 104.

Migration controller 108 may refer to a component configured to execute on or integrated with a physical computing device controlled by the client, which may be configured to manage the migration of one or more of VMs 106 from source cloud 102 to destination cloud 104. Migration controller 108 may be implemented as software, firmware, hardware, or any combination thereof. The physical computing device may be independent from source cloud 102 and destination cloud 104; alternatively, the physical computing device may refer to a physical node included in either of source cloud 102 or destination cloud 104. For example, migration controller 108 may be configured to execute on a computing device subject to the client's control, e.g., the client's laptop computer. Alternatively, migration controller 108 may refer to a virtual machine configured to execute on a physical node of source cloud 102 (or destination cloud 104), the virtual machine being controlled by the client to receive input from the client and to present feedback to the client. In at least some examples, migration controller 108 may be configured to manage the migration via connection 110A and 110B.

Connection 110A may refer to a data link that may follow at least one known communication protocol to support data transmission between migration controller 108 and source cloud 102. The communication protocol may include any mobile communications technology, e.g., Global System for Mobile Communications (GSM), Code Division Multiple Access (CDMA), etc., depending upon the technologies supported by particular wireless service providers. The one or more communication links may be implemented utilizing non-cellular technologies such as conventional analog Wi-Fi™, wireless local area network (WLAN) or IEEE 802.11, WiMAX™ (Worldwide Interoperability for Microwave Access), Bluetooth™, hard-wired connections, e.g., cable, phone lines, and other analog and digital wireless voice and data transmission technologies.

Connection 110B may also refer to a data link between migration controller 108 and destination cloud 104. The data link may also follow one communication protocol as described above with regard to connection 110A to support data transmission between migration controller 108 and destination cloud 104.

Migration controller 108 may be configured to facilitate creation or generation of one or more migration agreements that may apply to two or more parties of the client, the source cloud provider, and the destination cloud provider prior to migration of VMs 106 from source cloud 102 to destination cloud 104. The generation of the migration agreements may be based on input from the client, the source cloud provider, and/or the destination cloud provider. The agreements may specify terms that, if adhered to by the parties, facilitate the safe and effective migration of VMs 106. By way of example, safe and effective migration may refer to the data associated with VMs 106 not being misappropriated by or leaked to a third party or being copied before a deadline set forth in the agreements.

In some examples, migration controller 108 may be configured to generate a three way agreement in which the client, the source cloud provider, and the destination cloud provider are the three parties. In a non-limiting example for describing the generating of the three way agreement, migration controller 108 may generate an agreement template that includes one or more items for the client to check and/or fields for the client to complete. For example, the agreement template may include items representative of, at least, a quantity of VMs 106, a deadline by which the migration is to be completed, a reward provided by the client to the source cloud provider for completing the migration by the deadline; a penalty to the source cloud provider, the destination cloud provider, or both for failing to complete the migration by the deadline; and a sequence of the virtual machines to be migrated. The aforementioned reward and penalty may be monetary to a breaching party of the three way agreement. The client may check the items in the agreement template and/or input values to complete the fields, e.g., the quantity of VMs that the client plans to migrate, the deadline, the reward, etc. Migration controller 108 may then be configured to transmit the complete agreement template to the source cloud provider and the destination cloud provider to obtain a signed copy of the three way agreement that indicates the mutual intent to be bound between the three parties.

In some other examples, migration controller 108 may be configured to generate a first migration agreement between the client and the source cloud provider and a second migration agreement between the client and the destination cloud provider. Migration controller 108 may generate a first migration agreement template and a second migration agreement template, which both include one or more items for the client to check and/or fields for the client to input values. By checking the items and/or inputting the values, the client sets out the terms of the first migration agreement and the second migration agreement. The first migration agreement may include terms or clauses such as a quantity of VMs 106, a deadline by which the migration is to be completed, a reward provided by the client to the source cloud provider for completing the migration by the deadline; a penalty to the source cloud provider for failing to complete the migration by the deadline; and a sequence of the virtual machines to be migrated. The second migration agreement may include terms or clauses such as a quantity of VMs 106, a deadline by which the migration is to be completed; a penalty to the destination cloud provider for failing to complete the migration by the deadline; and a sequence of the virtual machines to be migrated.

During the creation of migration agreements, either the source cloud provider or the destination cloud provider may modify, specify, or supplement the terms of the migration agreements. For example, the source cloud provider may specify, in the migration agreements, that the migration can only occur between 1 AM and 3 AM. The client may accept the terms that are modified, specified, or supplemented by the source cloud provider or the destination cloud provider. Alternatively, the client may further modify negotiated terms of the migration agreements.

The migration agreements may further include other clauses including, but not limited, to a promise or an assurance from the source cloud provider to the client to migrate all data associated the VMs 106; a promise or an assurance from the source cloud provider to the client to destroy all the data associated with VMs 106 upon completion of the migration; a promise or an assurance from the source cloud provider promises to the client to encrypt all data associated with VMs 106 to be migrated prior to the migration; an assurance from the destination cloud provider to the client to examine the data and to determine whether the data is complete and safe; and a promise or an assurance from the destination cloud provider to the client to provide a safe computing environment, e.g., the computing environment being free from computer virus infection, for the execution of VMs 106 after the migration.

To determine the sequence of VMs 106 to be migrated, migration controller 108 may be configured to sort VMs 106 based on a usage frequency in either descending or ascending order. As referenced herein, the usage frequency may refer to a number of times that the client has utilized a particular one of VMs 106 during the period in which the client has rented VMs 106. At least one component, e.g., a hypervisor, in source cloud 102 may be configured to track the usage frequency of each of VMs 106. Migration controller 108 may sort VMs 106 based on the usage frequency received from source cloud 102 and transmit the sorting result to source cloud 102 and/or destination cloud 104.

Destination cloud 104 may receive, from migration controller 108 or source cloud 102, the sorting result in either descending or ascending order. Destination cloud 104 may be configured to then reserve computing resources for the execution of VMs 106, prior to the migration thereof. As referenced herein, the reserved computing resources may include CPU time, network bandwidth, memory space, etc. When the computing resources are reserved, destination cloud 104 may then notify source cloud 102 that destination cloud 104 is prepared for the migration.

When the sequence of VMs 106 to be migrated has been determined, migration controller 108 may be configured to select one from among multiple instances of VMs 106 and move the selected instance to destination cloud 104. As referenced herein, an instance may refer to the virtual machine executing on a physical node or one of one or more copies of the virtual machine stored on another physical node. A copy of a virtual machine may refer to a duplicate of all data associated with the virtual machine. The selecting of instances of VMs 106 is described in further detail in accordance with FIG. 2 below. Migration controller 108 may transmit the selecting result to source cloud 102 via connection 110A.

Further, migration controller 108 may instruct source cloud 102 to migrate the selected instances to destination cloud 104. That is, migration controller 108 may be configured to instruct on source cloud 102 to compress or convert the selected instances of VMs 106 into data packets. Data packets, as referenced herein, may refer to one or more groups of data that are broken down into similar structure of data for transmission. The one or more groups of data may include all data related to each selected instance of VMs 106 that are necessary for the execution of VMs on destination cloud 104. Data packets that correspond to one instance may be transmitted, by source cloud 102, to a physical node on destination cloud 104. The physical node may be referred to as "destination node" herein. If errors occur during the transmission, destination cloud 104 may submit feedback regarding or informing of the errors to source cloud 102, and source cloud 102 may take appropriate action based on the received feedback. Non-limiting examples of errors that may occur during migration of VM 106 from source cloud 102 to destination cloud 104 may include flawed data packets due to channel noises, memory overflow, etc. In the example of erroneous transmission of one or more data packets, source cloud 102 may re-transmit corresponding replacement data packets to destination cloud 104.

When the migration from source cloud 102 to destination cloud 104 has been completed by the deadline set forth in the three way agreement, the client may then reward the source cloud provider according to the migration agreements; otherwise, the source cloud provider may be penalized in accordance with the migration agreements. In some embodiments, the data associated with VMs 106 on source cloud 102 may be destroyed by source cloud 102, upon successful completion of the migration.

Subsequent to the migration from source cloud 102 to destination cloud 104, VMs 106 may be configured to execute on one or more physical nodes in destination cloud 104 to perform computing tasks for the client.

Figure 2:
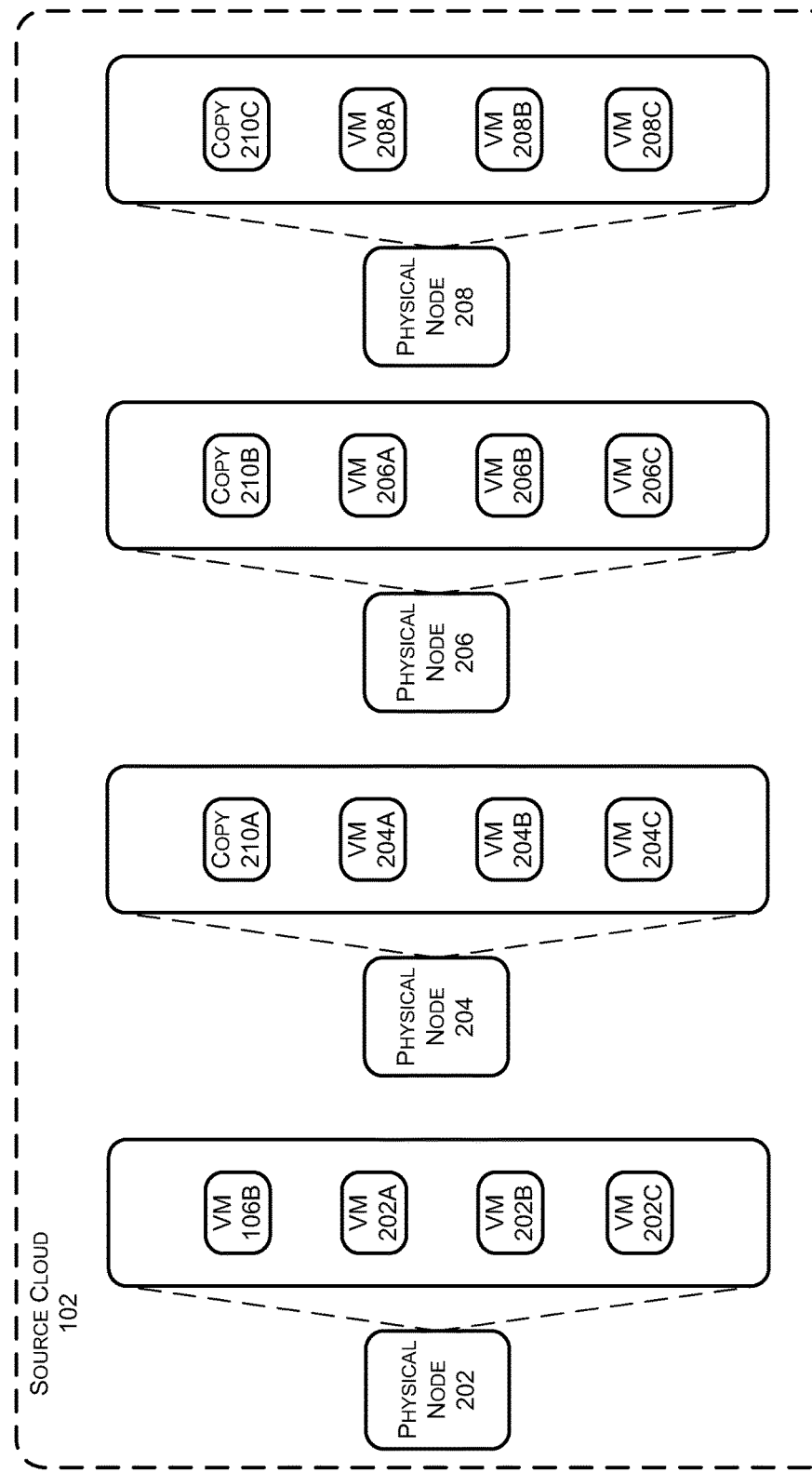
FIG. 2 shows example source cloud from which virtual machines may be migrated.

FIG. 2 shows example source cloud 102 from which virtual machines may be migrated, arranged in accordance with at least some embodiments described herein. As depicted, source cloud 102 may include at least one or more physical nodes 202, 204, 206, and 208 that may be located at different locations and connected through a communication network. One or more VMs 202A, 202B, . . . , 202N; 204A, 204B, . . . , 204N; 206A, 206B, . . . , 206N; 208A, 208B, . . . , 208N, and 106B may be respectively executed on one of the one or more physical nodes 202, 204, 206. One or more copies of VM 1066, copies 210A, 210B, . . . , 210N, may be respectively stored on physical nodes 204, 206, and 208. The number of physical nodes, the number of the VMs executed thereon, the number of copies of VM 106B are illustrated in FIG. 2 for simplicity, and one skilled in the art will appreciate that there may be different numbers. Further, unless context otherwise requires, collective reference may be made in the following description to "VMs 202," "VMs 204," "VMs 206," "Copies 210" or singular reference may be made to "VM 202," "VM 204," "VM 206," "Copy 210."

Physical node 202 may refer to a physical computing device in source cloud 102. One or more virtual machines including VM 106B and VMs 202 may execute on physical node 202. In accordance with the example embodiment of FIG. 1, VM 106B may refer to one of one or more virtual machines to be migrated from source cloud 102 to destination cloud 104, as requested or ordered by the client. VMs 202 may be referenced as "neighboring VMs" herein, and may refer to virtual machines executing on physical node 202 for clients other than the client requesting the migration. Thus, VMs 202 are not to be subjected to migration in the present example embodiment.

Similar to physical node 202, physical node 204 may refer to a physical computing device in source cloud 102 that may be configured to host one or more virtual machines. One or more virtual machines including VMs 204 may execute on physical node 204. In accordance with the example embodiment of FIG. 1, VMs 204 may also be referenced as "neighboring VMS" herein, and may refer to virtual machines executing on physical node 204 to perform computing tasks for clients other than the client requesting the migration. Similar to VMs 202, VMs 204 are not be subjected to migration in the present example embodiment.

In at least some examples, source cloud 102 may maintain one or more copies of VM 106B, e.g., copies 210 as illustrated, for data safety concern in case one or more of the copies are accidentally removed or destroyed. The copies, including copy 210A stored on physical node 204, may be periodically synchronized with the virtual machine, e.g., VM 106B, over the communication network of source cloud 102. That is, data generated by VM 106B will be duplicated to the copies and data deleted by the virtual machine will be removed from the copies. Copy 210A may represent a copy of VM 106B that is stored in one or more memory devices associated with physical node 204. Non-limiting examples of such memory devices may include hard disks, flash drives, etc.

Similar to physical node 204, physical node 206 may refer to a physical computing device in source cloud 102. One or more virtual machines including VMs 206 may execute on physical node 206. VMs 206 may be similarly referenced as "neighboring VMs" herein, and may refer to virtual machines executing on physical node 206 to perform computing tasks for clients other than the client requesting the migration. Copy 210B may represent a copy of VM 106B that is stored in one or more embodiments of memory devices associated with physical node 206. Non-limiting examples of such memory devices may include hard disks, flash drives, etc.

Similar to physical node 206, physical node 208 may refer to a physical computing device in source cloud 102. One or more virtual machines including VMs 208 may execute on physical node 208. VMs 208 may be similarly referenced as "neighboring VMs" herein, and may refer to virtual machines executing on physical node 208 to perform computing tasks for clients other than the client requesting the migration. Copy 210C may represent a copy of VM 106B that is stored in one or more embodiments of memory associated with physical node 204.

In at least some examples, migration controller 108 may be configured to instruct source cloud 102 to sequentially migrate the virtual machines based on a usage frequency. That is, the most frequently used virtual machine may be migrated first. With respect to one of the virtual machines to be migrated, migration controller 108 may be configured to select one from among the instances of the virtual machine and to instruct source cloud 102 to move the selected instance to destination cloud 104 in accordance with one or more schemes as describes below, or any combination thereof.

As mentioned above, since physical nodes 202, 204, 206, and 208 may be located at different geographical locations, the geographical distance between a physical node and the destination node may vary from physical node to physical node. Migration controller 108 may be configured to select one from among the instances in accordance with the geographical distance between a physical node and the destination node. That is, an instance may be selected if it is stored or executed on a physical node that is geographically closest, among physical nodes 202, 204, 206, and 208, to the destination node.

Additionally or alternatively, since there may be neighboring VMs on a same physical node as instances of VM 106B, migration controller 108 may be configured to select one from among the instances in accordance with a quantity of neighboring VMs or copies thereof. In other words, to minimize the impact on other clients caused by the migration, migration controller 108 may select an instance on a physical node, among physical nodes 202, 204, 206, and 208, corresponding to a least quantity of neighboring VMs.

Additionally or alternatively still, when there may be multiple virtual machines executing for the client on a physical node, the multiple virtual machines executing for a same client on a same physical node may be referred to as "sister VMs." For example, if instances of VM 106C are stored or executed on physical node 202, the instances of VM 106C may be referred to as "sister VMs" of VM 106B. Migration controller 108 may be configured to select an instance of VM 106B that executes on a physical node that corresponds to a largest quantity of sister VMs among physical nodes 202, 204, 206, and 208.

Once the instance is selected, migration controller 108 may be configured to notify source cloud 102 the selecting result. Source cloud 102 may then compress the selected instance, together with all sister VMs on the same physical node, into one or more data packets. The data packets may then be encrypted and transmitted to the destination node of destination cloud 104 by migration controller 108.

Figure 3:
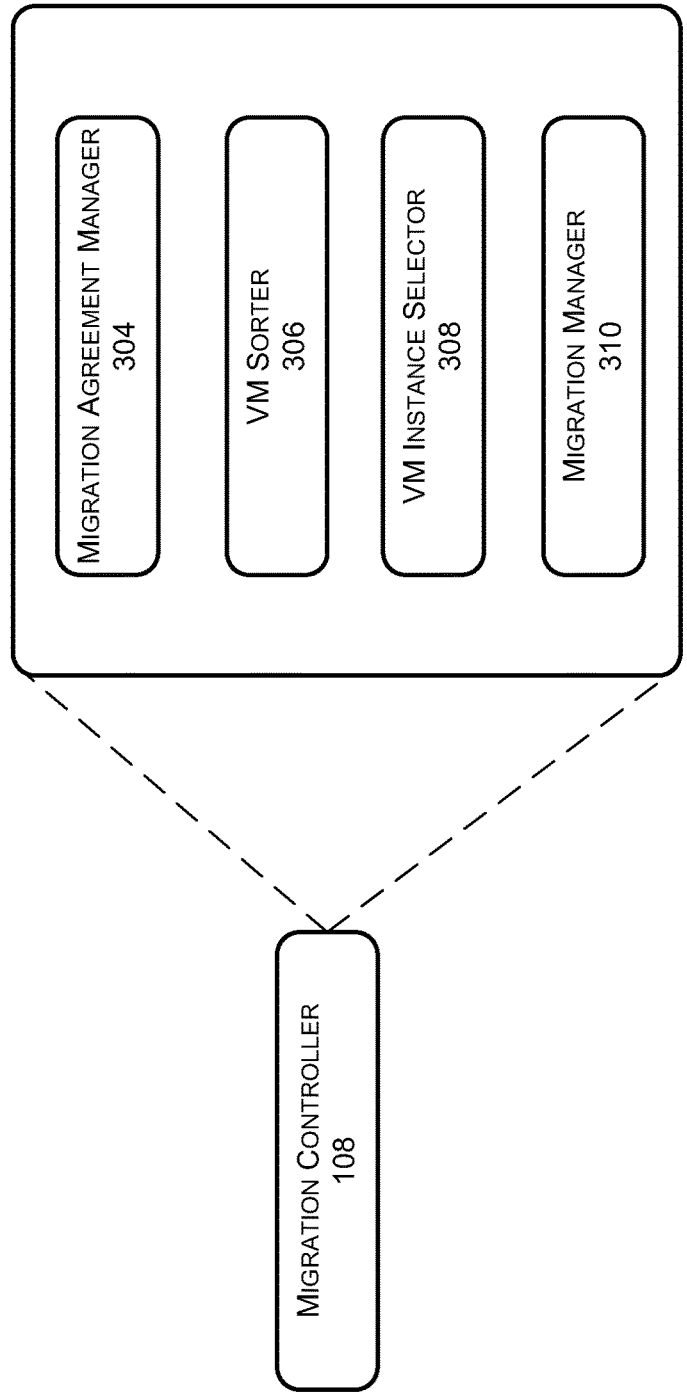
FIG. 3 shows an example migration controller by which virtual machines may be migrated.

FIG. 3 shows an example migration controller 108 by which virtual machines may be migrated, arranged in accordance with at least some embodiments described herein. As depicted, migration controller 108 may include, at least, a migration agreement manager 304, a VM sorter 306, a VM instance selector 308, and a migration manager 310.

Migration agreement manager 304 may refer to a component that may be configured to generate one or more migration agreements between the client, the source cloud provider, and the destination cloud provider prior to the migration of VMs 106 from source cloud 102 to destination cloud 104. The agreements may specify terms that, if adhered by the parties, facilitate the safe and effective migration of VMs 106. By way of example, safe and effective migration may refer to the data associated with VMs 106 not being misappropriated by or leaked to a third party or being copied before a deadline set forth in the agreements. In some examples, migration controller 108 may be configured to generate a three way agreement in which the client, the source cloud provider, and the destination cloud provider are the three parties. In a non-limiting example for describing the generating of the three way agreement, migration controller 108 may generate an agreement template that includes one or more items for the client to check and/or fields for the client to complete. The client may check the items in the agreement template and/or input values to complete the fields. Migration controller 108 may then be configured to transmit the completed agreement template to the source cloud provider and the destination cloud provider to obtain a signed copy of the three way agreement that indicates the mutual intent to be bound between the three parties. In accordance with various example embodiments, migration agreement manager 304 may be implemented as hardware, software, firmware, or any combination thereof.

In at least some examples, the migration agreements may include, at least, a quantity of VMs 106, a deadline by which the migration is to be completed, a reward provided by the client to the source cloud provider for completing the migration by the deadline, a penalty to the source cloud provider, the destination cloud provider, or both for failing to complete the migration by the deadline, and sequence of the virtual machines to be migrated. The reward and penalty may be monetary to a breaching party of the migration agreements. The migration agreements may further include other clauses including, but not limited, to an assurance from the source cloud provider to the client to migrate all data associated the VMs 106; an assurance from the source cloud provider to the client to destroy all the data associated with VMs 106 upon completion of the migration; an assurance from the source cloud provider promises to the client to encrypt all data associated with VMs 106 to be migrated prior to the migration; an assurance from the destination cloud provider to the client to examine the data and to determine whether the data is complete and safe; and an assurance from the destination cloud provider to the client to provide a safe computing environment, e.g., the computing environment being free from computer virus infection, for the execution of VMs 106 after the migration.

VM sorter 306 may refer to a component that may be configured to sort VMs 106 based on the usage frequency to determine the sequence of VMs 106 during the migration from source cloud 102 to destination cloud 104. As referenced above, the usage frequency may refer to a number of occurrences that the client utilizes a particular one of VMs 106 during the period that the client rents VMs 106. In some examples, VM sorter 306 may simply instruct source cloud 102 to sort VMs 106 based on the usage frequency and receive the sorting result from source cloud 102 when the sorting is completed. In accordance with various example embodiments, VM sorter 306 may be implemented as hardware, software, firmware, or any combination thereof.

VM instance selector 308 may refer to a component that may be configured to select an instance of each of VMs 106. In at least some examples, VM instance selector 308 may select instances in accordance with one or more schemes described herein and notify source cloud 102 the selecting result. In accordance with various example embodiments, VM instance selector 308 may be implemented as hardware, software, firmware, or any combination thereof.

As described above, since physical nodes 202, 204, 206, and 208 may be located at different geographical locations, the geographical distance between a physical node and the destination node may vary from physical node to physical node. In accordance with the geographical distance between each physical node and the destination node, VM instance selector 308 may be configured to select an instance of VM 106B. That is, an instance may be selected if it is stored or executed on a physical node that is geographically closest, among physical nodes 202, 204, 206, and 208, to the destination node.

Additionally or alternatively, since there may be neighboring VMs on a same physical node as instances of VM 106B, VM instance selector 308 may be configured to select an instance in accordance with a quantity of neighboring VMs or copies thereof. In other words, to minimize the impact on other clients caused by the migration, VM instance selector 308 may select an instance of VM 106B that executes on a physical node, among physical nodes 202, 204, 206, and 208, corresponding to a least quantity of neighboring VMs.

Additionally or alternatively still, when there may be multiple virtual machines executing for the client on a physical node, the multiple virtual machines, or instances thereof, executing for a same client on a same physical node may be referred to as "sister VMs." VM instance selector 308 may be configured to select an instance of VM 106B that executes on a physical node that corresponds to a largest quantity of sister VMs among physical nodes 202, 204, 206, and 208.

Migration manager 310 may refer to a component that may be configured to instruct source cloud 102 to migrate VMs 106 from source cloud 102 to destination cloud 104. That is, based on the sequence determined by VM sorter 306, migration manager 310 may request source cloud 102 to sequentially migrate VMs 106 in accordance with the usage frequency. That is, respect to each of VMs 106, source cloud 102 may compress the instance selected by VM instance selector 308, together with all instances of sister VMs on the same physical node, into one or more data packets. Further, source cloud 102 may encrypt and transmit the data packets to destination cloud 104.

Figure 4:
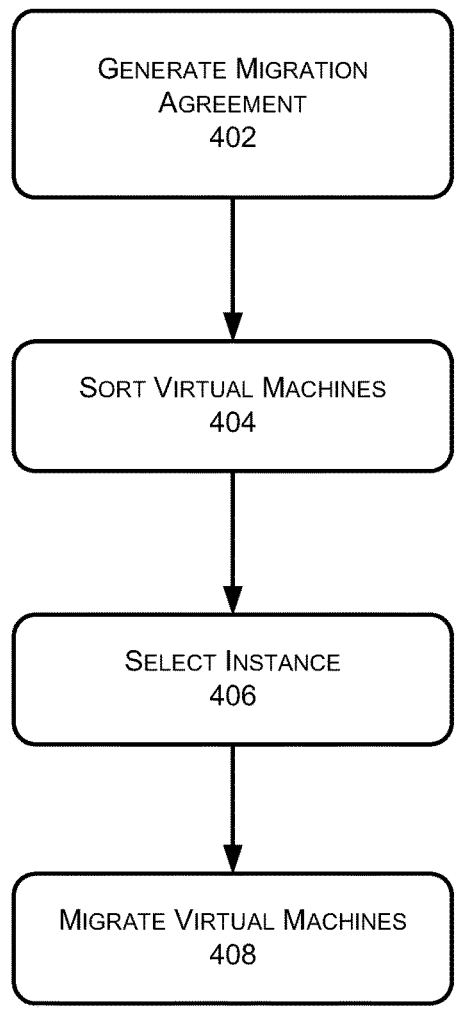
FIG. 4 shows an example configuration of a processing flow of operations by which virtual machines may be migrated.

FIG. 4 shows an example configuration of a processing flow of operations by which virtual machines may be migrated, arranged in accordance with at least some embodiments described herein. As depicted, processing flow 400 may include sub-processes executed by various components that are part of example system 100. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, and/or 408. Processing may begin at block 402.

Block 402 (Generate Migration Agreement) may refer to migration agreement manager 304 generating one or more migration agreements between the client, the source cloud provider, and the destination cloud provider prior to the migration from source cloud 102 to destination cloud 104. The process of generating the migration agreements is described in greater detail in accordance with FIG. 5.

In at least some examples, the migration agreements may include, at least, a quantity of VMs 106, a deadline by which the migration is to be completed, a reward provided by the client to the source cloud provider for completing the migration by the deadline, a penalty to the source cloud provider, the destination cloud provider, or both for failing to complete the migration by the deadline, and sequence of the virtual machines to be migrated. The reward and penalty may be monetary to a breaching party of the migration agreements. The migration agreements may further include other clauses including, but not limited to, a promise or an assurance from the source cloud provider to the client to migrate all data associated the VMs 106; a promise or an assurance from the source cloud provider to the client to destroy all the data associated with VMs 106 upon completion of the migration; a promise or an assurance from the source cloud provider promises to the client to encrypt all data associated with VMs 106 to be migrated prior to the migration; a promise or an assurance from the destination cloud provider to the client to examine the data and to determine whether the data is complete and safe; and a promise or an assurance from the destination cloud provider to the client to provide a safe computing environment, e.g., the computing environment being free from computer virus infection, for the execution of VMs 106 after the migration. Block 402 may be followed by block 404.

Block 404 (Sort Virtual Machines) may refer to VM sorter 306 sorting VMs 106 based on the usage frequency to determine the sequence of VMs 106 during the migration from source cloud 102 to destination cloud 104. As described above, the usage frequency may refer to a number of occurrences that the client utilizes a particular one of VMs 106 during the period that the client rents VMs 106. In some examples, VM sorter 306 may simply instruct source cloud 102 to sort VMs 106 based on the usage frequency and receive the sorting result from source cloud 102 when the sorting is completed. Block 404 may be followed by block 406.

Block 406 (Select Instance) may refer to VM instance selector 308 selecting an instance of each of VMs 106. In at least some examples, VM instance selector 308 may select instances in accordance with one or more schemes described above.

As described above, VM instance selector 308 may be configured to select an instance of VM 106B, the instance being stored on a physical node that is geographically closest, among physical nodes 202, 204, 206, and 208, to the destination node. Additionally or alternatively, VM instance selector 308 may select an instance of VM 106B that executes on a physical node corresponding to a least quantity of neighboring VMs, among physical nodes 202, 204, 206, and 208. Additionally or alternatively still, VM instance selector 308 may be configured to select an instance of VM 106B that executes on a physical node corresponding to a largest quantity of sister VMs, among physical nodes 202, 204, 206, and 208. Block 406 may be followed by block 408.

Block 408 (Migrate Virtual Machines) may refer to migration manager 310 instructing source cloud 102 to migrate VMs 106 from source cloud 102 to destination cloud 104. That is, based on the sequence determined by VM sorter 306, migration manager 310 may request source cloud 102 to sequentially migrate VMs 106A, 106B, and 106C in accordance with the usage frequency. That is, the most frequently used virtual machine may be migrated first. With respect to each of VMs 106A, 106B, and 106C, source cloud 102 may compress the instance selected by VM instance selector 308, together with all instances of sister VMs on the same physical node, into one or more data packets. Further, migration manager 301 may encrypt and transmit the data packets to destination cloud 104.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
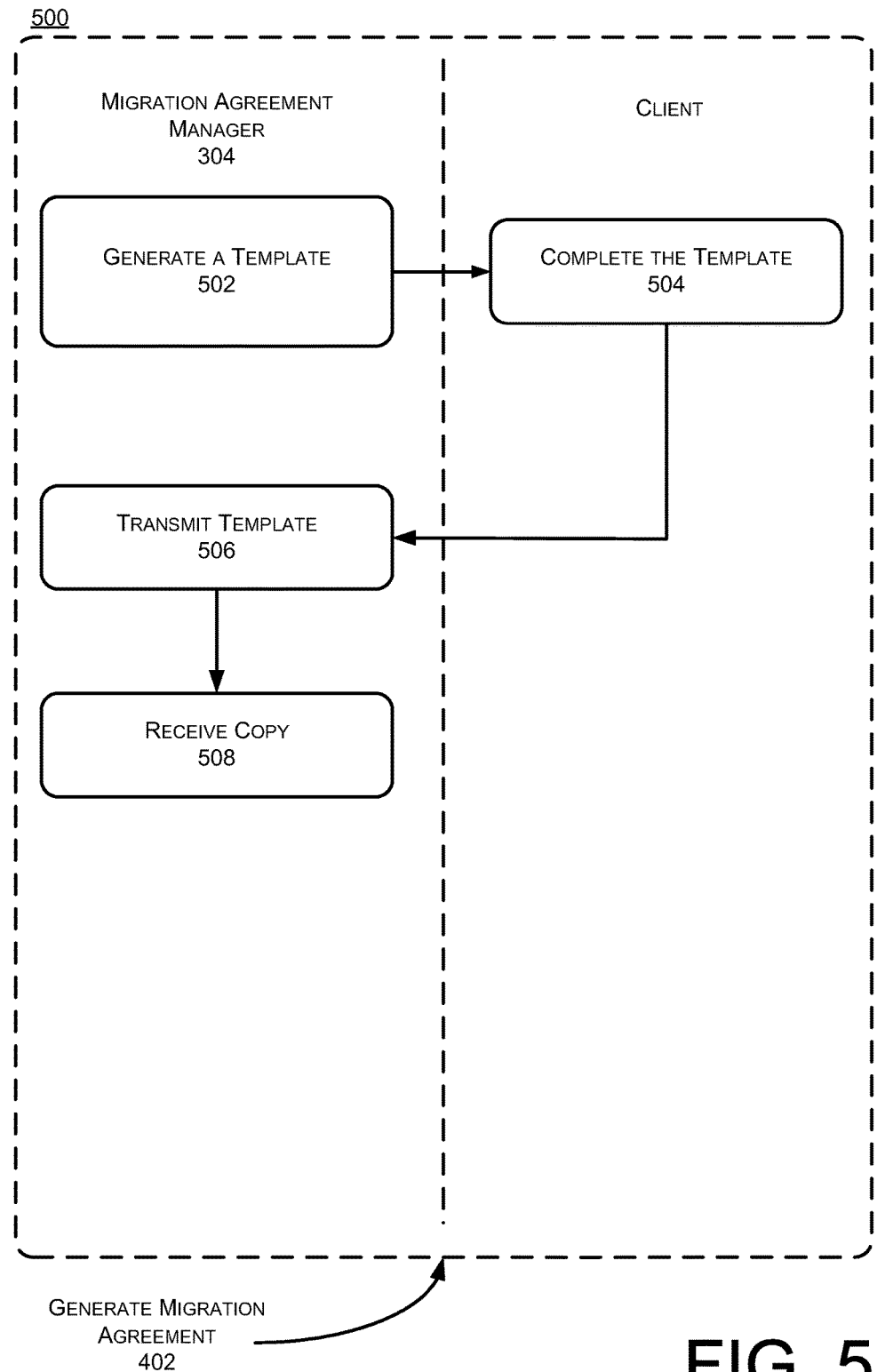
FIG. 5 shows an example configuration of a sub-processing flow of operations by which virtual machines may be migrated.

FIG. 5 shows an example configuration of a sub-processing flow of operations by which virtual machines may be migrated, arranged in accordance with at least some embodiments described herein. As depicted, processing flow 400 may include sub-processes executed by various components that are part of example system 100. However, processing flow 500 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, 506, and/or 508. Processing may begin at block 502.

Block 502 (Generate a Template) may refer to migration agreement manager 304 generating one or more agreement templates for the migration agreements between the client, the source cloud provider, and the destination cloud provider.

In some examples, migration controller 108 may be configured to generate an agreement template for the three way agreement. The agreement template may include one or more items for the client to check and/or fields for the client to complete. For example, the agreement template may include items representative of, at least, a quantity of VMs 106, a deadline by which the migration is to be completed, a reward provided by the client to the source cloud provider for completing the migration by the deadline; a penalty to the source cloud provider, the destination cloud provider, or both for failing to complete the migration by the deadline; and a sequence of the virtual machines to be migrated.

In some other examples, migration controller 108 may generate a first migration agreement template for the first migration agreement and a second migration agreement template for the second migration agreement. Both templates may include one or more items for the client to check and/or fields for the client to input information. Block 502 may be followed by block 504.

Block 504 (Complete the Template) may refer to the client completing the aforementioned templates by checking items on the templates and/or inputting values or other information to the templates. For example, the client may specify the reward if the migration is completed by the deadline set forth in the migration agreement. Block 504 may be followed by block 506.

Block 506 (Transmit Template) may refer to migration controller 108 transmitting the agreements, based on the templates, completed by the client to the source cloud provider and the destination cloud provider via connection 110A and 110B. Block 506 may be followed by block 508.

Block 508 (Receive Copy) may refer to migration controller 108 receiving, from the source cloud provider and destination cloud provider, one or more signed copies of the migration agreements that indicate the mutual intent to be bound between the three parties.

Figure 6:
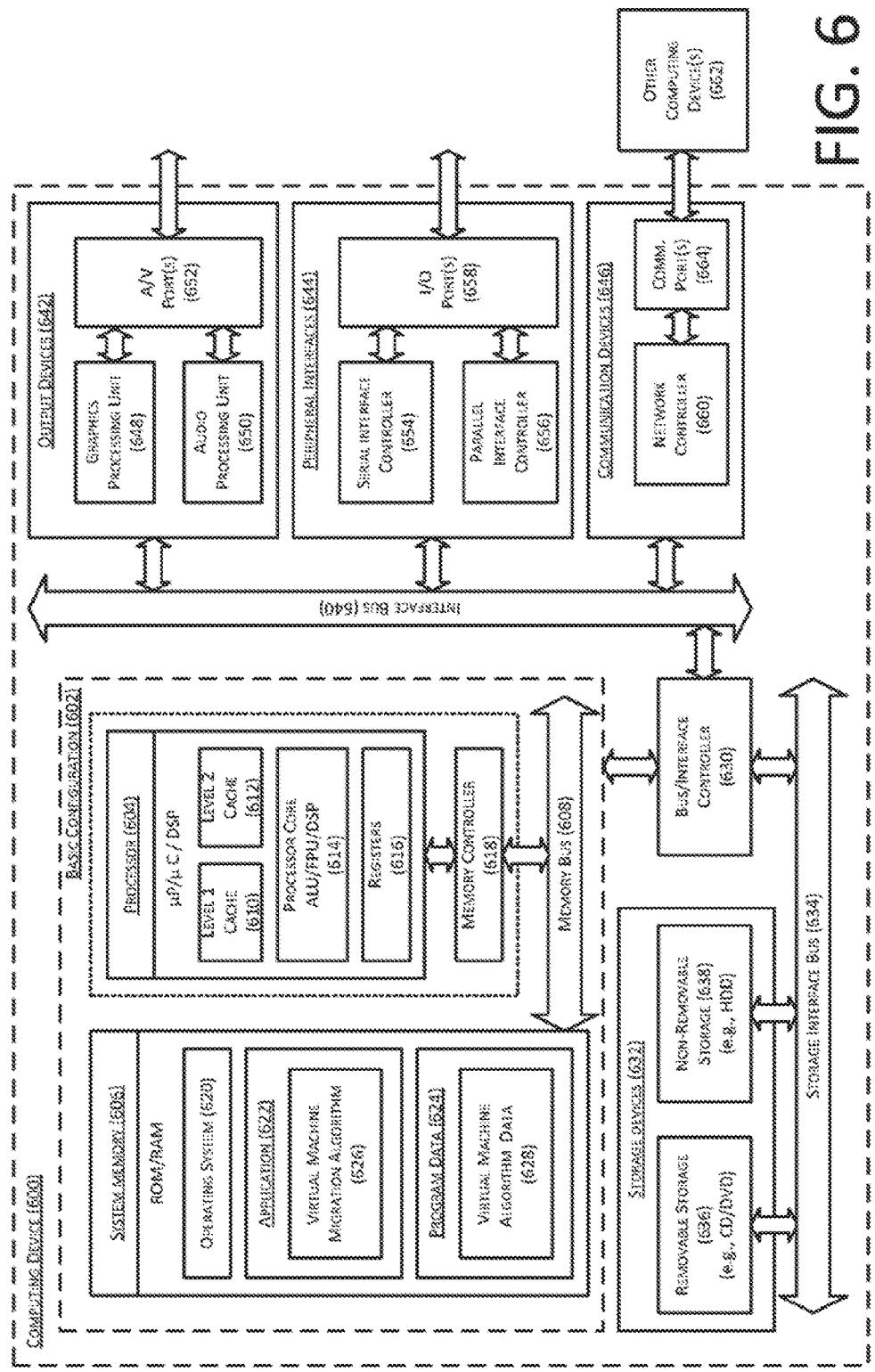
FIG. 6 shows a block diagram illustrating an example computing device that is arranged to migrate virtual machines, all arranged in accordance with at least some embodiments described herein.

FIG. 6 shows a block diagram illustrating an example computing device 600 that is arranged for migrating virtual machines, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a virtual machine migration algorithm 626 that is arranged to perform the functions as described herein including those described with respect to process 400 of FIG. 4. Program data 624 may include virtual machine algorithm data 628 that may be useful for operation with virtual machine migration algorithm 626 as is described herein. In some embodiments, application 622 may be arranged to operate with program data 624 on operating system 620 such that implementations of virtual machine migration algorithm may be provided as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method of virtual machine migration, the method comprising:
   establishing one or more migration agreements,
      wherein the one or more migration agreements apply to two or more of a client, a source cloud, and a destination cloud, wherein the one or more migration agreements include identifiers, provided by the client, of one or more virtual machines to be migrated from the source cloud to the destination cloud under terms of the one or more migration agreements, and wherein the source cloud maintains at least two instances of each of the one or more virtual machines to be migrated in a respective node, the at least two instances includes each respective virtual machine to be migrated and at least one copy of the each respective virtual machine to be migrated;

ordering a sequence of the one or more virtual machines to be migrated, wherein the ordering is based on one of a usage frequency of respective ones of the one or more virtual machines to be migrated;

identifying one instance of each of the one or more virtual machines to be migrated based on proximity between the respective node and a destination node on the destination cloud; and instructing the source cloud to migrate the identified instance of each of the one or more virtual machines to be migrated under terms of the one or more migration agreements.

2. The method of claim 1, wherein the migration agreements include at least one of:
   a quantity of the multiple virtual machines to be migrated,
   a deadline by which the migrating is to be completed,
   a reward for completing the migrating by the deadline, and
   a penalty for failing to complete the migrating by the deadline.

3. The method of claim 1, further comprising notifying the destination cloud to reserve one or more computer resources to execute the identified instances.

4. The method of claim 1, wherein the usage frequency is generated based on a frequency of use of each of the one or more virtual machines.

5. The method of claim 1, wherein the instructing comprises notifying the source cloud to compress the identified instance of each of the multiple virtual machines into a data packet and to transmit the data packets to the destination cloud.

6. The method of claim 1, wherein the instructing further comprises:
   receiving feedback, from the destination cloud, that identifies one or more flawed data packets; and
   notifying the source cloud to re-transmit data to replace the identified flawed data packets.

7. The method of claim 1, wherein the ordering is based on a quantity of respective neighboring virtual machines that are controlled by another client of the source cloud.

8. A system, comprising:
   a source cloud that includes multiple physical nodes;
   multiple virtual machines to be migrated to a destination cloud,
      wherein the multiple virtual machines execute on the source cloud, and
      wherein the source cloud maintains at least two instances of each of the multiple virtual machines in a respective node of the multiple physical nodes, the at least two instances includes each respective virtual machine and at least one copy of the each respective virtual machine; and a migration controller configured to:
      establish one or more migration agreements, wherein the one or more migration agreements apply to two or more of a client, the source cloud, and the destination cloud;
      order a sequence of the multiple virtual machines to be migrated, wherein the sequence is ordered based on a usage frequency of respective ones of the multiple virtual machines to be migrated;
      identify one of the at least two instances of each of the multiple virtual machines to migrate based on proximity between the respective node and a destination node on the destination cloud;
      instruct the source cloud to migrate the identified instance of each one of the multiple virtual machines to be migrated in accordance with the sequence to the destination cloud under terms of the one or more migration agreements; and
      reward or penalize a service provider of the source cloud in accordance with the one or more migration agreements.

9. The system of claim 8, wherein the migration agreements include at least one of:
   a quantity of the multiple virtual machines to be migrated,
   a deadline by which the migrating is to be completed,
   a reward for completion of the migration of the multiple virtual machines by the deadline, and
   a penalty for failing to complete the migration of the multiple virtual machines by the deadline.

10. The system of claim 8, wherein the migration controller is further configured to instruct the destination cloud to reserve one or more computing resources to execute the identified instances of the multiple virtual machines.

11. The system of claim 8, wherein the migration controller is further configured to instruct the source cloud to compress the selected copy of each of the sorted multiple virtual machines into a data packet, and to instruct the source cloud to transmit the data packet to the destination cloud.

12. The system of claim 8, wherein the migration controller is further configured to:
   receive feedback, from the destination cloud, that identifies one or more flawed data packets; and
   instruct the source cloud to re-transmit data to replace the flawed data packets.

13. The system of claim 8, wherein the sequence is ordered based on a quantity of neighbor virtual machines that are controlled by another client of the source cloud.

14. The system of claim 8, wherein the usage frequency is generated based on a frequency of use of each of the multiple virtual machines.

15. A non-transitory computer-readable medium that stores executable-instructions that, when executed, cause one or more processors to perform operations for virtual machine migration, including:
   establishing one or more migration agreements,
      wherein the one or more migration agreements apply to two or more of a client, a source cloud, and a destination cloud,
      wherein the one or more migration agreements include identifiers, provided by the wherein the one or more migration agreements include identifiers, provided by the cloud under terms of the one or more migration agreements, and
      wherein the source cloud maintains at least two instances of each of the multiple virtual machines to be migrated in a respective node, the at least two instances including each respective virtual machine to be migrated and at least one copy of each respective virtual machine to be migrated;

ordering a sequence of the multiple virtual machines to be migrated, wherein the ordering is based on a quantity of respective neighboring virtual machines that are controlled by another client of the source cloud;

identifying one instance of each of the multiple virtual machines to be migrated based on proximity between the respective node and a destination node on the destination cloud; and instructing the source cloud to migrate the identified instance of each of the multiple virtual machines to be migrated under terms of the one or more migration agreements.

16. The non-transitory computer-readable medium of claim 15, wherein the migration agreements include at least one of:

a quantity of the multiple virtual machines to be migrated, a deadline by which the migration of the multiple virtual machines is to be completed, a reward for completing the migration of the multiple virtual machines by the deadline, and a penalty for failing to complete the migration of the multiple virtual machines by the deadline.

17. The non-transitory computer-readable medium of claim 15, wherein the instructions, in response to execution by the one or more processor, further cause the one or more processor to:

notify the destination cloud to reserve one or more computing resources to execute the identified instances of the multiple virtual machines.

18. The non-transitory computer-readable medium of claim 15, wherein the usage frequency is generated based on a frequency of use of each of the multiple virtual machines.

19. The non-transitory computer-readable medium of claim 15, wherein the instruction comprises:

notify the source cloud to compress the identified instance of each of the multiple virtual machines into a data packet and to transmit the data packet to the destination cloud.

20. The non-transitory computer-readable medium of claim 15, wherein the order is based on a geographic location of the respective node.

21. The non-transitory computer-readable medium of claim 15, wherein the instructions, in response to execution by the one or more processors, further cause the one or more processors to penalize or reward a service provider of the source cloud in accordance with the migration agreements.

* * * * *

UNITED STATES PATENT AND TRADEMARK OFFICE
CERTIFICATE OF CORRECTION

| | | |
|---|---|---|
| PATENT NO. | : 9,727,363 B2 | Page 1 of 1 |
| APPLICATION NO. | : 14/438783 | |
| DATED | : August 8, 2017 | |
| INVENTOR(S) | : Wang | |

It is certified that error appears in the above-identified patent and that said Letters Patent is hereby corrected as shown below:

In the Specification

In Column 8, Line 6, delete "VM 1066," and insert -- VM 106B, --, therefor.

In Column 17, Line 62, delete "at least one and one or more" and insert -- "at least one" and "one or more" --, therefor.

In Column 17, Line 65, delete "an limits" and insert -- "an" limits --, therefor.

In Column 18, Lines 1-2, delete "one or more or at least one" and insert -- "one or more" or "at least one" --, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*